(12) United States Patent
Rollinger et al.

(10) Patent No.: US 10,208,659 B2
(45) Date of Patent: Feb. 19, 2019

(54) COORDINATION OF CAM TIMING AND BLOW-THROUGH AIR DELIVERY

(71) Applicant: Ford Global Technologies, LLC, Dearborn, MI (US)

(72) Inventors: John Eric Rollinger, Troy, MI (US); Adam J. Richards, Canton, MI (US); Robert Andrew Wade, Plymouth, MI (US); David Bell, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 15/276,582

(22) Filed: Sep. 26, 2016

(65) Prior Publication Data

US 2017/0009644 A1 Jan. 12, 2017

Related U.S. Application Data

(62) Division of application No. 13/474,540, filed on May 17, 212, now Pat. No. 9,476,365.

(51) Int. Cl.
*F02B 37/20* (2006.01)
*F02D 41/00* (2006.01)
*F02D 13/02* (2006.01)
*F02D 23/02* (2006.01)
*F02M 26/05* (2016.01)
*F02B 37/16* (2006.01)
*F02D 41/38* (2006.01)
*F02B 37/12* (2006.01)

(52) U.S. Cl.
CPC ............ *F02B 37/20* (2013.01); *F02B 37/168* (2013.01); *F02D 13/0215* (2013.01); *F02D 13/0261* (2013.01); *F02D 23/02* (2013.01); *F02D 41/005* (2013.01); *F02D 41/0007* (2013.01); *F02D 41/0065* (2013.01); *F02D 41/0077* (2013.01); *F02D 41/38* (2013.01); *F02M 26/05* (2016.02); *F02B 37/12* (2013.01); *F02D 2041/001* (2013.01); *F02D 2041/389* (2013.01); *Y02T 10/144* (2013.01); *Y02T 10/18* (2013.01); *Y02T 10/47* (2013.01)

(58) Field of Classification Search
CPC ... Y02T 10/144; Y02T 10/18; F02M 25/0707; F02M 25/071; F02M 25/0749; F02D 41/0007; F02D 13/0261; F02D 2041/001; F02D 23/00
USPC ........... 123/568.11–568.32; 60/605.1, 605.2; 701/102, 103, 104, 108
See application file for complete search history.

(56) References Cited

U.S. PATENT DOCUMENTS 4,689,960 A 9/1987 Schroder et al.
5,064,423 A 11/1991 Lorenz et al.
(Continued)

FOREIGN PATENT DOCUMENTS

EP 0754843 A2 1/1997
WO 2011038240 A1 3/2011

*Primary Examiner* — Sizo Vilakazi
(74) *Attorney, Agent, or Firm* — Julia Voutyras; McCoy Russell LLP

(57) ABSTRACT

Methods and systems are provided for reducing turbo lag by directing intake air from an intake manifold to an exhaust manifold. The intake air may be directed via an EGR passage by opening an EGR valve or by may be directed via engine cylinders by increasing positive valve overlap. Amounts of air directed via external EGR and air directed via positive valve overlap are based on engine operating conditions.

12 Claims, 4 Drawing Sheets

(56) References Cited

U.S. PATENT DOCUMENTS

| | | | |
|---|---|---|---|
| 5,461,860 A | 10/1995 | Schegk | |
| 5,819,693 A | 10/1998 | Curtil | |
| 6,003,315 A | 12/1999 | Bailey | |
| 6,715,287 B1* | 4/2004 | Engel | F02D 41/0007 60/601 |
| 7,322,194 B2 | 1/2008 | Sun et al. | |
| 8,256,217 B2* | 9/2012 | Inoue | F02D 41/045 123/492 |
| 8,931,273 B2 | 1/2015 | Rollinger et al. | |
| 8,997,484 B2 | 4/2015 | Rollinger et al. | |
| 9,002,625 B2 | 4/2015 | Tsuyuki et al. | |
| 9,279,396 B2 | 3/2016 | Rollinger et al. | |
| 9,382,838 B2 | 7/2016 | Rollinger et al. | |
| 2007/0074512 A1* | 4/2007 | Evers | F02B 37/24 60/602 |
| 2007/0125083 A1* | 6/2007 | Rollinger | B60K 6/48 60/605.1 |
| 2007/0246008 A1 | 10/2007 | Gerum | |
| 2011/0087420 A1* | 4/2011 | Stewart | F02D 31/007 701/102 |
| 2011/0094482 A1* | 4/2011 | Weber | F02B 47/08 123/568.12 |
| 2011/0132335 A1 | 6/2011 | Pursifull et al. | |
| 2012/0317976 A1 | 12/2012 | Gerum et al. | |
| 2013/0080023 A1* | 3/2013 | Livshiz | F02P 5/1504 701/102 |
| 2013/0098033 A1 | 4/2013 | Murakami et al. | |
| 2013/0305715 A1 | 11/2013 | Rollinger et al. | |

* cited by examiner

COORDINATION OF CAM TIMING AND BLOW-THROUGH AIR DELIVERY

CROSS REFERENCE TO RELATED APPLICATION

The present application is a divisional of U.S. patent application Ser. No. 13/474,540, entitled "COORDINATION OF CAM TIMING AND BLOW-THROUGH AIR DELIVERY," filed on May 17, 2012, the entire contents of which are incorporated herein by reference for all purposes.

TECHNICAL FIELD

This application relates to the field of motor-vehicle engineering, and more particularly, to air induction in motor vehicle engine systems.

BACKGROUND AND SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing engine load, engine speed, or mass air flow. For example, when the engine load increases rapidly, a turbocharger compressor may require increased torque to deliver an increased air flow. Such torque may not be available, however, if the turbine that drives the compressor is not fully spun up. As a result, an undesirable power lag may occur before the intake air flow builds to the required level.

It has been recognized previously that a turbocharged engine system may be adapted to provide "blow-through" air wherein boosted intake air is driven from the intake manifold, downstream of the compressor, directly into the exhaust manifold, upstream of the turbine. For example, a variable cam timing may be temporarily adjusted to a timing that provides high valve overlap. During the positive valve overlap, the boosted air is inducted through the cylinders into the turbine to temporarily provide extra mass flow and enthalpy in the exhaust. The extra turbine energy enables the turbine to spin-up faster reducing turbo lag.

However, the inventors herein have identified potential issues with such an approach. As one example, the valve timing corresponding to the high valve overlap position may not be a timing that is optimal for engine performance. That is, the valve timing may have to be temporarily moved away from a desired timing. Consequently, the high valve overlap position may degrade brake specific fuel consumption (BSFC) as well as the indicated engine torque production. As such, this degrades engine fuel economy and performance. As another example, a fast response of the variable cam timing (VCT) device is required to transiently move to the blow-through (or high valve overlap) position and then return to the regular timing (with reduced valve overlap). If the required response time is faster than can be provided by the VCT device, engine performance and fuel economy may be further degraded. Further still, in order to provide the blow-through, the engine has to be in a positive pumping regime (that is, under boosted engine operation), else may occur in an opposite direction to that desired, degrading turbocharger performance.

Thus, at least some of the above issues may be addressed by a method for a turbocharged engine. In one embodiment, the method comprises, directing intake air from an intake manifold, downstream of a compressor, to an exhaust manifold, upstream of a turbine via each of external EGR and positive valve overlap through a cylinder, wherein amounts of air directed via EGR and air directed via positive valve overlap are adjusted based on conditions. In this way, intake air can be directed to the exhaust manifold to rapidly increase exhaust pressure without degrading engine performance.

As an example, in response to a tip-in, a controller may determine an amount of blow-through air to be directed from the intake manifold to the exhaust manifold to expedite turbine spin-up. The determined amount of blow-through air may then be delivered via the cylinders if a cylinder intake and/or valve timing can be adjusted from a current timing (e.g., a timing corresponding to negative valve overlap) to a timing that enables positive valve overlap without degrading combustion stability. For example, the intake and/or exhaust valves may be operated via a variable cam timing (VCT) device and it may be determined if the VCT adjustment required to place the valves at a valve timing that provides positive valve overlap is within a pre-defined range. As such, outside this range, engine torque output may be affected and/or combustion stability may be degraded. If the required VCT adjustment is within the range, then intake and/or valve timings may be adjusted to temporarily provide positive valve overlap, and intake air may be directed from the intake manifold to the exhaust manifold via the cylinders during the positive valve overlap.

If, however, the required VCT adjustment would degrade combustion stability and engine torque output, at least a portion of the blow-through air may be provided via an EGR passage coupled between the intake and exhaust manifolds. For example, an EGR valve may be opened while no VCT adjustment is performed to direct the entire amount of blow-through air via the EGR passage. Alternatively, a smaller VCT adjustment (that is, within the desired range) may be performed so that a portion of the blow-through air is provided via a smaller amount of positive valve overlap, while a remaining portion of the blow-through air is provided via the EGR passage. In each case, a fuel injection amount may be adjusted during the directing of blow-through air via positive valve overlap and/or EGR based on the amount of blow-through air so that an exhaust air-to-fuel ratio is maintained substantially at stoichiometry.

In this way, extra mass flow and enthalpy may be provided in the exhaust to expedite turbine spin-up and reduce turbo lag without degrading engine performance. By providing at least a portion of blow-through air via an EGR passage, turbo lag may be addressed while valve timing is retained at a timing that improves engine performance. By using positive valve overlap to direct the blow-through air only when there is no fuel penalty associated with a VCT adjustment, engine fuel economy is also improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
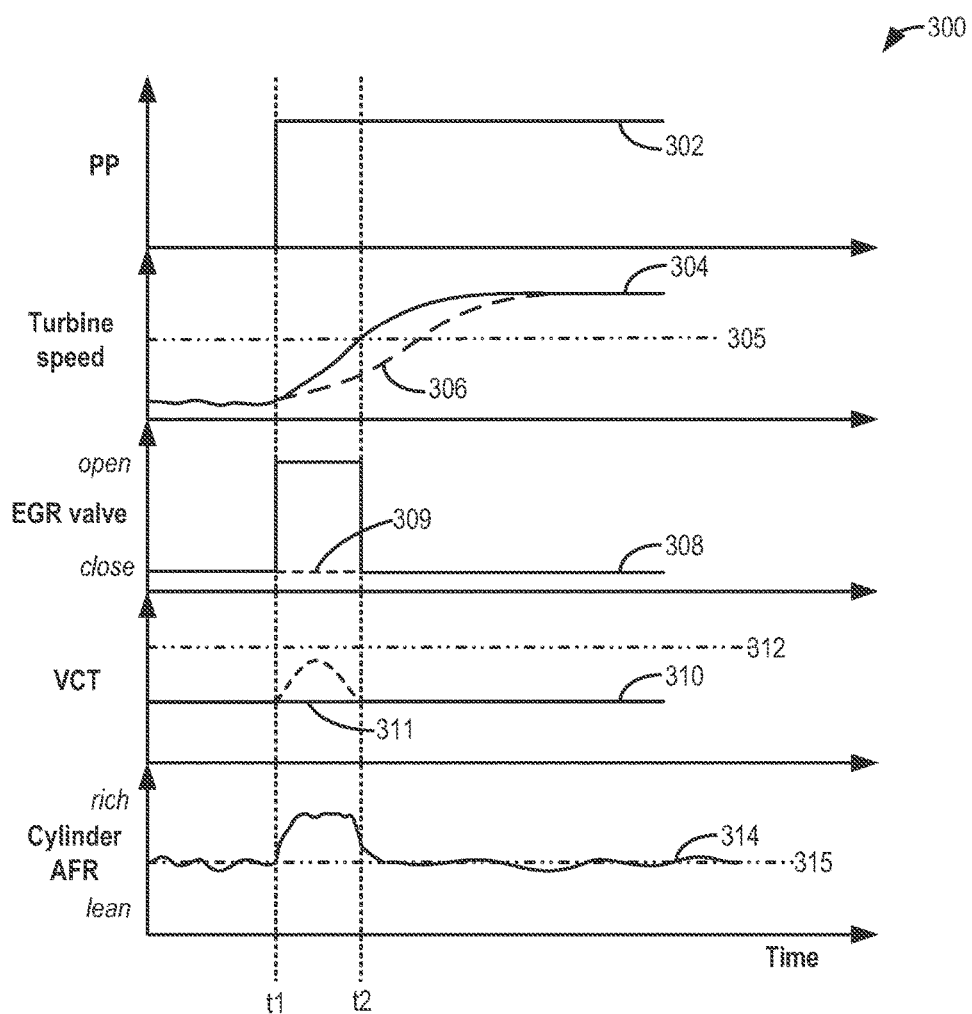
FIGS. 3-4 illustrate example operations for directing intake air to an exhaust manifold to reduce turbo lag, according to the present disclosure.
Figure 4:
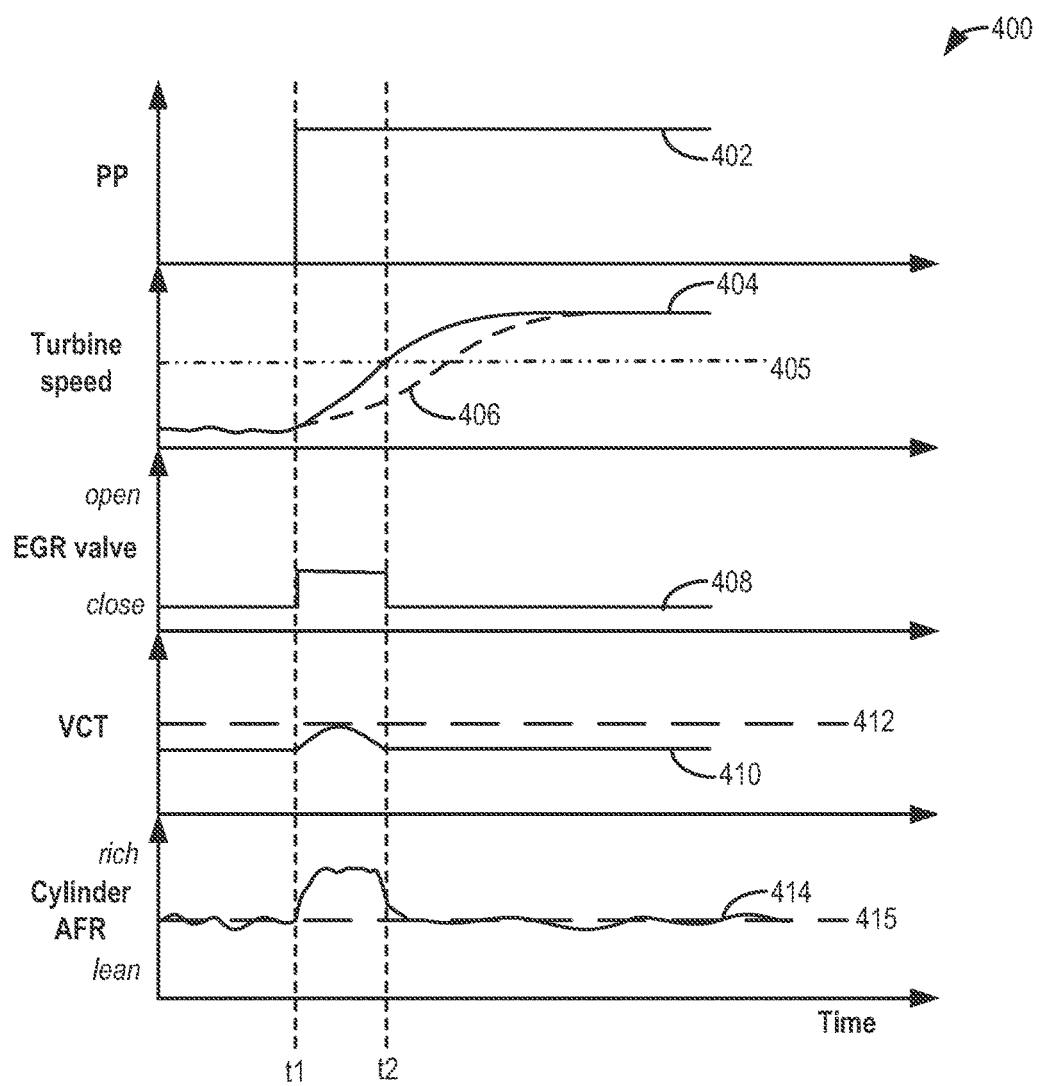

Methods and systems are provided for directing an amount of intake air from an intake manifold to an exhaust manifold of an engine system (such as the engine system of FIG. 1) via engine cylinders using positive valve overlap and/or via an EGR passage. In response to a tip-in, an engine controller may be configured to perform a control routine, such as the example routine of FIG. 2, to adjust a variable cam timing device to adjust intake and/or exhaust valve timings of an engine cylinder towards positive valve overlap so as to provide an amount of blow-through air via the cylinders. However, if the VCT adjustment degrades engine torque output and combustion stability, the controller may be configured to direct at least a portion of the blow-through air via an EGR passage of the engine system. The controller may also determine a ratio of blow-through air delivered via positive valve overlap relative to delivered via an EGR passage based on engine operating conditions. A fuel injection is adjusted while providing the blow-through air to maintain an exhaust air-to-fuel ratio at stoichiometry. Example adjustments are illustrated at FIGS. 3-4. In this way, turbine spin-up may be expedited without degrading engine performance.

Figure 1:
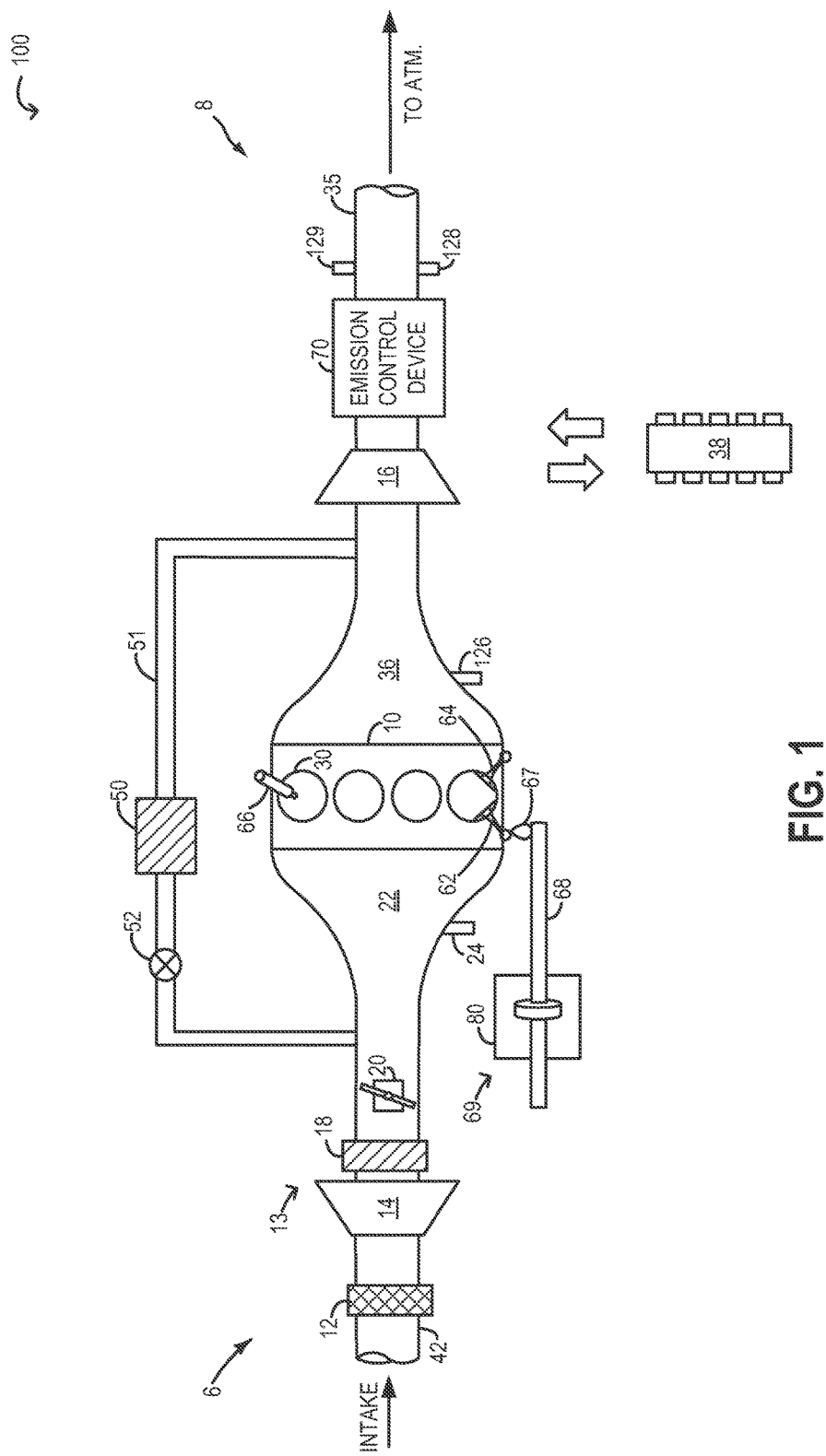
FIG. 1 schematically shows aspects of an example engine system in accordance with an embodiment of this disclosure.

FIG. 1 schematically shows aspects of an example engine system 100 including an engine 10. In the depicted embodiment, engine 10 is a boosted engine coupled to a turbocharger 13 including a compressor 14 driven by a turbine 16. Specifically, fresh air is introduced along intake passage 42 into engine 10 via air cleaner 12 and flows to compressor 14. A flow rate of ambient air that enters the intake system through intake air passage 42 can be controlled at least in part by adjusting throttle 20. Compressor 14 may be any suitable intake-air compressor, such as a motor-driven or driveshaft driven supercharger compressor. In engine system 10, however, the compressor is a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 14 is coupled, through charge-air cooler 18 to throttle valve 20. Throttle valve 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

Combustion chambers 30 may be supplied one or more fuels, such as gasoline, alcohol fuel blends, diesel, biodiesel, compressed natural gas, etc. Fuel may be supplied to the combustion chambers via injector 66. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 70 may be released into the atmosphere via exhaust conduit 35.

Depending on operating conditions, a portion of exhaust may be recirculated from the exhaust manifold 36, upstream of turbine 16, to intake manifold 22, downstream of compressor 14 via EGR passage 51, through EGR cooler 50 and EGR valve 52. In this manner, high pressure exhaust gas recirculation (HP-EGR) may be enabled. In some embodiments, in addition to the HP-EGR, low pressure exhaust gas recirculation (LP-EGR) may also be enabled wherein a portion of treated exhaust is recirculated from the exhaust manifold 36, downstream of turbine 16, to intake manifold 22, upstream of compressor 14 via a low pressure EGR passage and therein coupled EGR cooler and EGR valve (not shown). EGR valve 52 may be opened to admit a controlled amount of cooled exhaust gas to the intake manifold for desirable combustion and emissions-control performance. The relatively long EGR flow path in engine system 10 provides excellent homogenization of the exhaust gas into the intake air charge. Further, the disposition of EGR take-off and mixing points provides very effective cooling of the exhaust gas for increased available EGR mass and improved performance.

It will be appreciated that based on differences between intake and exhaust manifold pressures, EGR passage 51 may be used to direct flow in a first direction from the exhaust manifold to the intake manifold to provide (high pressure) EGR, or in a second direction, from the intake manifold to the exhaust manifold to provide blow-through air for turbine spin-up (as elaborated below). Specifically, when intake manifold pressure (MAP) exceeds exhaust manifold pressure (EXHMAP), EGR valve 52 may be opened to recirculate exhaust gas from upstream of turbine 16 to downstream of compressor 14. In comparison, when exhaust manifold pressure (EXHMAP) exceeds intake manifold pressure (MAP), EGR valve 52 may be opened to direct compressed intake air from downstream of compressor 14 to upstream of turbine 16. As such, there may be errors in the estimation of MAP and EXHMAP. For example, the estimated values of MAP and exhaust manifold pressure may be 50 inHg and 48 inHg respectively, allowing for blow-through air to be directed from the intake manifold to the exhaust manifold. However, the actual values of MAP and exhaust manifold pressure may be 48 inHg and 50 inHg respectively. This would cause air and exhaust gas to actually flow in an opposite direction, from the exhaust manifold to the intake manifold.

To reduce such errors, a dead-band may be including when comparing MAP to exhaust manifold pressure (EXHMAP). For example, to enable blow-through air to be directed from the intake manifold to the exhaust manifold via EGR passage 51, it may be confirmed that MAP exceeds EXHMAP by at least a threshold amount (e.g., MAP>EXHMAP+X). In comparison, to enable EGR through EGR passage 51, it may be confirmed that EXHMAP exceeds MAP by at least a threshold amount (e.g., EXHMAP>MAP+Y). By including dead-bands when comparing intake and exhaust manifold pressures, tolerance for variation in measurement or estimation of intake and exhaust manifold pressures is provided.

Each cylinder 30 may be serviced by one or more valves. In the present example, each cylinder 30 includes a corresponding intake valve 62 and an exhaust valve 64. Engine system 100 further includes one or more camshafts 68 for operating intake valve 62 and/or exhaust valve 64. In the depicted example, intake camshaft 68 is coupled to intake valve 62 and can be actuated to operate intake valve 62. In some embodiments, where the intake valve of a plurality of cylinders 30 are coupled to a common camshaft, intake camshaft 68 can be actuated to operate the intake valves of all the coupled cylinders.

Intake valve 62 is actuatable between an open position that allows intake air into the corresponding cylinder and a closed position substantially blocking intake air from the cylinder. Intake camshaft 68 may be included in intake valve actuation system 69. Intake camshaft 68 includes intake cam 67 which has a cam lobe profile for opening intake valve 62 for a defined intake duration. In some embodiments (not shown), the camshaft may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 68 longitudinally and switching between cam profiles.

In the same manner, each exhaust valve 64 is actuatable between an open position allowing exhaust gas out of the corresponding cylinder and a closed position substantially retaining gas within the cylinder. It will be appreciated that while only intake valve 62 is shown to be cam-actuated, exhaust valve 64 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 68, when included, the exhaust camshaft may include an exhaust cam having a cam lobe profile for opening exhaust valve 64 for a defined exhaust duration. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing systems, for example, variable cam timing VCT system 80. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

VCT system 80 may be a twin independent variable camshaft timing system, for changing intake valve timing and exhaust valve timing independently of each other. VCT system 80 includes intake camshaft phaser 82 coupled to the common intake camshaft 68 for changing intake valve timing. The VCT system may likewise include an exhaust camshaft phaser coupled to a common exhaust camshaft for changing exhaust valve timing. VCT system 80 may be configured to advance or retard valve timing by advancing or retarding cam timing and may be controlled by controller 38. VCT system 80 may be configured to vary the timing of valve opening and closing events by varying the relationship between the crankshaft position and the camshaft position. For example, VCT system 80 may be configured to rotate intake camshaft 68 independently of the crankshaft to cause the valve timing to be advanced or retarded. In some embodiments, VCT system 80 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 68 can be adjusted to thereby vary an opening and/or closing timing of intake valve 62. As such, by varying the opening and closing of intake valve 62, an amount of positive overlap between intake valve 62 and exhaust valve 64 can be varied. For example, VCT system 80 may be adjusted to advance or retard an opening and/or a closing of intake valve 62 relative to a piston position.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected boosted engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

In engine system 100, during periods of rapidly increasing engine load, such as immediately after start-up, upon tip-in, or upon exiting DFSO, the amount of intake air compression provided by the compressor may be inadequate. During at least some of these conditions, the amount of boost pressure available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

To expedite turbine spin-up and reduce turbo lag, an amount of compressed intake air, herein referred to as blow-through air, may be directed from the intake manifold to the exhaust manifold to provide extra mass flow for spinning up the turbine. In addition, a fuel injection may be enriched commensurate with the blow-through air amount to provide extra enthalpy for spinning up the turbine. The blow-through air may be provided while the engine has at least some boost, that is, while an intake manifold pressure (MAP) is higher than the exhaust manifold pressure by at least a threshold amount. Based on engine operating conditions prevalent at the time blow-through air is requested, the required amount of blow-through air may be provided via external EGR (that is, through EGR passage 51) and/or via the engine cylinders through positive valve overlap.

Specifically, to provide the blow-through air via external EGR (that is, through EGR passage 51), while intake manifold pressure is higher than the exhaust manifold pressure by the threshold amount, EGR valve 52 may be opened to direct compressed intake air from the intake manifold, downstream of compressor 14, into the exhaust manifold, upstream of turbine 16. In one example, blow-through air may be provided only via external EGR if the valve timing for providing positive valve overlap would degrade engine fuel economy, combustion stability, and torque output. As another example, blow-through air may be provided only via external EGR if the VCT adjustment required to provide positive valve overlap is outside a threshold.

In comparison, to provide the blow-through via the engine cylinders, VCT system 80 may be adjusted from an initial position having no positive valve overlap to a final position having increased positive valve overlap. In one example, blow-through air may be provided only via positive valve overlap if the valve timing for providing positive valve overlap would not degrade engine fuel economy, combustion stability, and torque output. As another example, blow-through air may be provided only via positive valve overlap if flow through the EGR passage would degrade engine performance (e.g., when a difference between intake manifold pressure and boost pressure is not larger than a threshold amount).

Figure 2:
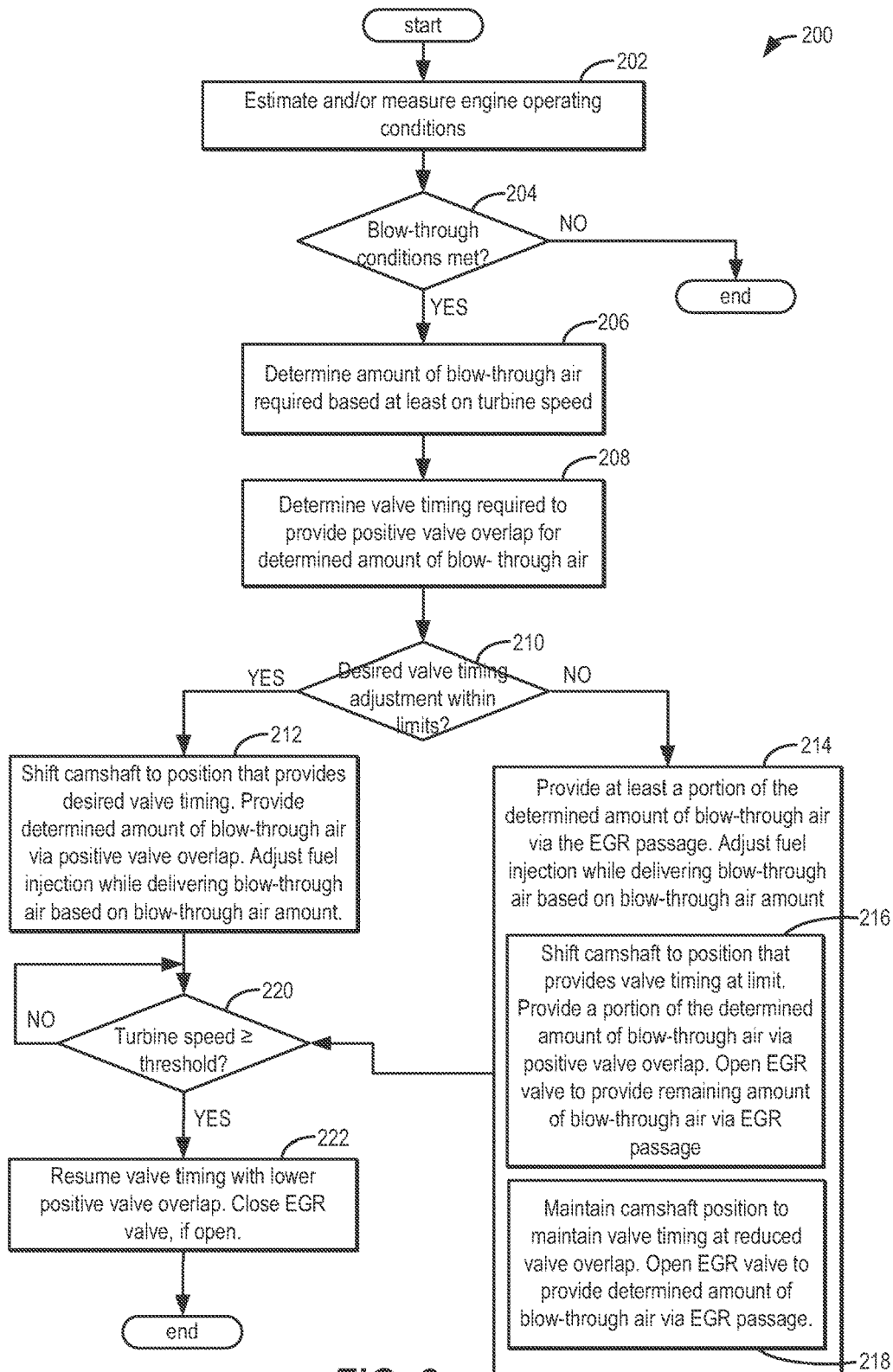
FIG. 2 illustrates an example method for directing intake air to an exhaust manifold through an EGR passage and/or through engine cylinders.

As elaborated with reference to FIG. 2, based on engine operating conditions, an engine controller may alternatively direct intake air from the intake manifold to the exhaust manifold via each of the external EGR and positive valve overlap, an amount of air delivered via the external EGR and an amount of air delivered via the positive valve overlap adjusted based on the engine operating conditions. Herein, VCT adjustments within the threshold may be used so that valve timing is held within combustion stability limits while a portion of the blow-through air is provided via the cylinders. The remaining portion of blow-through air may then be provided via the EGR passage.

FIG. 1 also shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system—throttle valves, compressor by-pass valves, waste gates, EGR valves and shut-off valves, various reservoir intake and exhaust valves, for example—as needed to enact any of the control functions described herein. Further, to assess operating conditions in connection with the control functions of the engine system, the electronic control system may be operatively coupled to a plurality of sensors arranged throughout the engine system—flow sensors, temperature sensors, pedal-position sensors, pressure sensors, etc.

As described above, FIG. 1 shows a non-limiting example of an internal combustion engine. It should be understood that in some embodiments, the engine may have more or less combustion cylinders, control valves, throttles, and compression devices, among others. Example engines may have cylinders arranged in a "V" configuration. Further, a common intake camshaft may control the intake valves for a first set of cylinders on a first bank while a second intake camshaft may control the intake valves for a second set of cylinders on a second bank. That is, a common camshaft of a cam actuation system (e.g., a VCT system) may be used to control valve operation of a group of cylinders.

In this way, the system of FIG. 1 enables a method for reducing turbo lag by directing compressed intake air from an intake manifold to an exhaust manifold, in response to a tip-in, via external EGR and/or via positive valve overlap through one or more engine cylinders.

Now turning to FIG. 2, method 200 shows an example routine for providing blow-through air from an intake manifold to an exhaust manifold via one or more of an EGR passage and via engine cylinders using positive valve overlap. Amounts of blow-through air delivered via EGR and via positive valve overlap are based on engine operating conditions including torque output, fuel penalties, boost pressure, etc. By adjusting the amounts based on engine operating conditions, turbo lag may be addressed without degrading engine performance and fuel economy.

At 202, the method includes estimating and/or measuring engine operating conditions. These may include, for example, engine speed, torque output, exhaust temperature, exhaust catalyst temperature, turbine speed, intake manifold pressure (MAP), boost pressure, barometric pressure (BP), exhaust manifold pressure, pedal position, vehicle speed, etc. At 204, based on the estimated engine operating conditions, it may be determined if blow-through conditions have been met. In one example, blow-through conditions may be met in response to a tip-in event. In another example, blow-through conditions may be met in response to a turbine speed being lower than a threshold at the time of the tip-in. Herein, in response to the tip-in event, compressed intake air may be blown through and directed from the intake manifold to the exhaust manifold to spin-up the turbine and increase turbine speed and engine boost.

Confirming blow-through conditions may further include confirming that intake manifold pressure (MAP) is higher than an exhaust manifold pressure. That is, a positive pumping regime may be confirmed. As such, there may be errors in the estimation of MAP and exhaust manifold pressure. For example, the estimated values of MAP and exhaust manifold pressure may be 50 inHg and 48 inHg respectively, allowing for a positive pumping regime and allowing for blow-through air to be directed from the intake manifold to the exhaust manifold. However, the actual values of MAP and exhaust manifold pressure may be 48 inHg and 50 inHg respectively. This would cause air and exhaust gas to actually flow in an opposite direction, from the exhaust manifold to the intake manifold.

To reduce such errors, a dead-band may be including when comparing MAP to exhaust manifold pressure (EXH-MAP). For example, to confirm that blow-through conditions are met, it may be confirmed that MAP is higher than exhaust manifold pressure by at least a threshold amount (e.g., MAP>EXHMAP+X). In comparison, to enable EGR (which is a flow in the opposite direction from the exhaust manifold to the intake manifold), it may be confirmed that exhaust manifold pressure is higher than MAP by at least a threshold amount (e.g., EXHMAP>MAP+Y). By including dead-bands when comparing intake and exhaust manifold pressures, tolerance for variation in measurement or estimation of intake and exhaust manifold pressures is provided.

Upon confirming blow-through conditions, at 206, the routine includes determining an amount of blow-through air required based at least on the turbine speed. For example, as a difference between the current turbine speed and a threshold speed increases, a larger amount of blow-through air may be required to spin-up the turbine. Next, at 208, a valve timing required to provide the determined amount of blow-through air via positive valve overlap may be determined. For example, the valve timing may be currently at a first valve timing that corresponds to no positive valve overlap or lower positive valve overlap. The controller may be configured to determine a second valve timing corresponding to higher positive overlap. In addition, the controller may determine a VCT adjustment required to shift the valve timing from the initial valve timing to the final valve timing corresponding to increased positive valve overlap so that the determined amount of blow-through air can be provided through the cylinders.

At 210, it may be determined if the valve timing, and/or corresponding VCT adjustment, required to provide the blow-through air via positive valve overlap is within a limit. For example, it may be determined if the second valve timing corresponding to the (increased) positive valve overlap exceeds a combustion stability limit. As such, if the (second) valve timing required to provide the blow-through air amount is outside the limit, combustion stability may be degraded. As another example, it may be determined if a difference between the first valve timing (with negative valve overlap or reduced positive valve overlap) and the second valve timing (with higher positive valve overlap) is within a threshold. As such, if the difference between the valve timings is higher than the threshold, torque disturbances may be caused by the valve timing change. Additionally, the response time of the VCT system may not enable such a large timing difference to be achieved and/or an initial timing to be resumed as fast as required, further degrading engine performance.

If the valve timing is within the limit, then at 212, the routine includes, adjusting a variable cam timing device to adjust an intake and/or exhaust valve timing of the engine cylinder(s) from a first valve timing corresponding to no positive valve overlap (or lower positive valve overlap) to a second valve timing corresponding to positive intake valve to exhaust valve overlap (or increased positive valve overlap). Then, once the valve timing has been adjusted, intake air may be directed from the intake manifold to the exhaust manifold via positive overlap through the cylinder(s). In addition, during the directing, a fuel injection amount may be adjusted based on the amount of air directed via positive valve overlap so as to maintain an exhaust air-to-fuel ratio at or around stoichiometry. For example, during the directing, cylinder fuel injection may be temporarily shifted to a richer fuel injection, wherein a degree of richness of the rich fuel injection is based on the amount of air directed as blow-through air via the cylinders using positive valve overlap. By adjusting the cylinder fuel injection during the directing based on the amount of blow-through air, exhaust conditions and the performance of an exhaust catalyst can be maintained.

If the valve timing is not within the limit at 210, then at 214, the engine controller may be configured to direct at least a portion of intake air from the intake manifold, downstream of a compressor, to the exhaust manifold, upstream of a turbine via external EGR. Specifically, if the second valve timing corresponding to positive valve overlap exceeds the combustion stability limit, then at 214, the controller is configured to increase the amount of air directed via external EGR while decreasing the amount of air directed via positive valve overlap. The amounts of air directed via EGR and air directed via positive valve overlap may be adjusted based on engine operating conditions.

As used herein, directing intake air via external EGR includes opening an EGR valve in an EGR passage coupled between the intake manifold, downstream of the compressor, and the exhaust manifold upstream of the turbine. As elaborated above, directing intake air via positive valve overlap includes adjusting a variable cam timing device to adjust an intake and/or exhaust valve timing of the cylinder from the first valve timing corresponding to no positive valve overlap (or reduced positive valve overlap) to the second valve timing corresponding to (increased) positive intake valve to exhaust valve overlap.

Providing at least a portion of the blow-through air amount via the external EGR may include, for example at 216, adjusting the VCT system to shift the camshaft to a position that provides a valve timing at or before the limit (e.g., the combustion stability limit). For example, the valve timing may be shifted from the first valve timing to a third valve timing that is before the second valve timing and that is before (or at) the combustion stability limit. By positioning the valve timing at or before the limit, a smaller portion of the determined amount of blow-through air is provided via the positive valve overlap through the cylinders. Then, the EGR valve may be adjusted so that a remaining, larger portion of the determined amount of blow-through air is provided via external EGR.

In another example, if a change in engine torque corresponding to the variable cam timing device adjustment is higher than a threshold amount, the controller may increase the amount of air directed via external EGR while decreasing the amount of air directed via positive valve overlap. Herein, the torque penalty of providing the blow-through air via the cylinders exceeds the torque gain in expediting turbine spin-up, and therefore a larger portion of the blow-through air is provided via the external EGR. As another example, if a difference between the first valve timing and the second valve timing exceeds a threshold, the controller may increase the amount of air directed via external EGR while decreasing the amount of air directed via positive valve overlap. Herein, the timing difference may be such that the VCT system may not be able to shift from the initial position to the blow-through position in time and/or may not be able to resume the original position in an appropriate amount of time. As a result, engine performance may be degraded. Therefore, as in the above examples, a larger portion of the blow-through air may be provided via the external EGR.

As used herein, increasing the amount of air directed via external EGR includes increasing an opening of the EGR valve, and decreasing the amount of air directed via positive valve overlap includes maintaining valve timing at or before a timing corresponding to the combustion stability limit.

While the above examples illustrate adjusting the amounts of air directed via external EGR and via positive valve overlap based on valve timing and VCT adjustments relative to combustion stability and engine performance limits, in still another example, the adjusting may be based on engine operating conditions, such as exhaust catalyst temperature. As an example, the adjusting may include, when an exhaust catalyst temperature is higher than a threshold temperature, increasing the amount of air directed via external EGR while decreasing the amount of air directed via positive valve overlap.

In an alternate example, providing at least a portion of the blow-through air via external EGR may include, at 218, providing the entire portion of the determined blow-through air via the external EGR. Herein, in response to the second valve timing being outside the combustion stability limit, a VCT adjustment may be performed to maintain the camshaft at a position corresponding to no positive valve overlap (or reduced positive valve overlap). For example, the valve timing may be maintained at the first valve timing and may not be moved to the second valve timing. At the same time, the EGR valve may be opened to provide the desired amount of compressed intake air to the exhaust manifold via external EGR.

In one example, in response to the tip-in event, while turbine speed is lower than a threshold, the controller may reduce turbo lag by opening an EGR valve to direct at least some compressed intake air from the intake manifold to the exhaust manifold via the EGR passage while maintaining the cylinder valve timing at negative valve overlap (that is, at the first valve timing). The controller may then close the EGR valve after the turbine speed reaches the threshold.

It will be appreciated that in each of the above examples, during the directing of intake air, the controller may adjust a fuel injection amount based on the amounts of air directed via EGR and/or air directed via positive valve overlap so as to maintain an exhaust air-to-fuel ratio at or around stoichiometry. Specifically, while directing compressed intake air via the EGR passage and/or the positive valve overlap, the controller may adjust the fuel injection to the cylinders to be richer than stoichiometry, with a degree of richness of the fuel injection based on an amount of compressed intake air directed as blow-through air via the EGR passage and/or the positive valve overlap, so as to maintain an exhaust air-to-fuel ratio at or around stoichiometry.

While the above examples illustrate adjusting the amounts so as to increase the amount of blow-through air provided via EGR while decreasing the amount of air provided via positive valve overlap, it will be appreciated that in still other examples, the amounts may be adjusted to decrease the amount of blow-through air provided via EGR while increasing the amount of air provided via positive valve overlap. As an example, when a difference between intake manifold pressure and exhaust manifold pressure is lower than a threshold, the controller may decrease the amount of air directed via external EGR while increasing the amount of air directed via positive valve overlap. Herein, blow-through air may be delivered via external EGR only when the engine is in a positive pumping regime and with sufficient difference between the intake manifold pressure and the exhaust manifold pressure so as to reduce the likelihood of air flowing in the opposite direction, from the exhaust manifold to the intake manifold, via the EGR passage.

The directing of compressed intake air from the intake manifold to the exhaust manifold via only positive valve overlap (at 212) or via at least some external EGR (at 214) is performed until a turbine speed reaches a threshold speed. Accordingly, at 220, it may be determined if the turbine has spun-up and reached the threshold speed. If no, the directing of blow-through air to the exhaust manifold, upstream of the turbine, may continue until the turbine has spun-up. If the turbine has spun-up, then at 222, the initial valve timing corresponding to negative valve overlap (or lower positive valve overlap) may be resumed. Specifically, if any blow-through air was provided via positive valve overlap, the camshaft may be shifted back to the original position. In one example, the camshaft adjustment may return the valve timing from the second valve timing to the first valve timing. Additionally, if any blow-through was provided via the EGR passage, the EGR valve may be closed to stop directing air through external EGR.

In this way, by providing at least a portion of the required amount of blow-through air via external EGR and a portion of the required amount of blow-through air via positive valve overlap, turbine spin-up can be expedited without shifting a valve timing to a timing that degrades engine performance and reduces fuel economy.

Example valve timing and EGR adjustments that expedite turbine spin-up are now described with reference to FIGS. 3-4.

At FIG. 3, map 300 shows an example engine operation wherein turbo lag is reduced by directing intake air from downstream of a compressor in the intake manifold to upstream of a turbine in the exhaust manifold via only positive valve overlap (dashed line) or via only external EGR (solid line). In the depicted example, the engine includes a variable cam timing (VCT) device for adjusting the cylinder valve timing. Specifically, map 300 depicts a change in pedal position (PP) at plot 302, a change in turbine speed at plot 304, an opening or closing state of an EGR valve in an EGR passage coupled upstream of the turbine and downstream of the compressor at plots 308 and 309, a change in camshaft position (or VCT adjustment) that adjusts a corresponding cylinder valve timing at plots 310 and 311, and a change in cylinder air-to-fuel ratio (cylinder AFR) relative to stoichiometry at plot 314.

Before t1, the engine may be operating with low boost. For example, the engine may be operating un-boosted or at a low boost level, as indicated by low turbine speeds at plot 304. At t1, a tip event is confirmed, as indicated by the change in pedal position (plot 302). In response to the tip-in event, a controller may be configured to direct compressed intake air from the intake manifold, downstream of a compressor, to the exhaust manifold, upstream of a turbine, to thereby provide additional mass flow and enthalpy to expedite turbine spin-up. As such, the compressed intake air that is blown-through, herein also referred to as blow-through air, may be provided via an EGR passage of the engine and/or may be provided through one or more engine cylinders operating with positive valve overlap.

As an example, during a first tip-in, an engine controller may open an EGR valve (plot 308, solid line) at t1 to direct intake air from the intake manifold to the exhaust manifold via the high pressure EGR passage while maintaining a camshaft position (plot 310, solid line) such that cylinder valve timing is maintained at a timing corresponding to lower positive valve overlap. This may include, for example, maintaining the cylinder valve timing at negative valve overlap. This allows blow-through air to be provided via the EGR passage only.

In one example, during the first tip-in, the valve timing (plot 310) is maintained at the timing corresponding to negative valve overlap because a valve timing required to provide positive overlap may be outside of a combustion stability limit 312. That is, if the camshaft position were adjusted to shift the valve timing to positive valve overlap (so as to provide blow-through air via the cylinders), combustion stability and engine torque output may be degraded. Alternatively, during the first tip-in, a difference between the cylinder valve timing at lower positive valve overlap and a cylinder valve timing at positive valve overlap may be higher than a threshold amount due to which a timely VCT adjustment to and from the positive valve overlap position may not be possible. In still another example, during the first tip-in, a change in engine torque output per degree of VCT change may be higher than a threshold amount. In other words, one or more of engine torque output, combustion stability, and fuel economy may be degraded if a VCT adjustment is used to provide the blow-through air via positive valve overlap. Thus, to reduce turbo lag without incurring the torque and fuel economy penalties associated with the VCT adjustment, the blow-through air may be provided via external EGR instead.

In particular, the EGR valve may be opened for a duration between t1 and t2 (plot 308). With the EGR valve open, compressed intake air may be directed from downstream of the compressor to upstream of the turbine via the EGR passage to provide extra mass flow to spin-up the turbine (plot 304) between t1 and t2. As such, during the first tip-in, a difference between intake manifold pressure and exhaust manifold pressure may be higher than a threshold so that flow is directed from the intake manifold to the exhaust manifold through the EGR passage (and not in the opposite direction).

During the first tip-in, while directing air through the EGR passage, a fuel injection amount to the engine cylinders may be adjusted. Specifically, the fuel injection may be adjusted based on the total amount of air directed from the intake manifold to the exhaust manifold via the EGR passage so to maintain an exhaust air-to-fuel substantially at stoichiometry. In the depicted example, between t1 and t2, a fuel injection is temporarily enriched (plot 314) with a degree of richness based on the amount of air directed via the EGR passage. By providing additional fuel to match the additional blow-through air, a cylinder air-to-fuel ratio, and therefore an exhaust air-to-fuel ratio, may be maintained at stoichiometry 315. Additionally, the extra enthalpy may be directed to the turbine to further expedite turbine spin-up.

At t2, the turbine speed may reach a threshold speed 305 beyond which further blow-through air may not be required to assist in turbine spin-up. Consequently, at t2, the EGR valve may be closed (plot 308). By providing blow-through air (herein via external EGR), turbine spin-up is expedited. As such, in the absence of blow-through air, the turbine spin-up may have been slower, as shown by plot 306 (dashed line). In this way, during the first tip-in, blow-through air may be provided via external EGR to reduce turbo lag.

As an alternate example, during a second, different tip-in, the engine controller may maintain an EGR valve (plot 309, dashed line) closed while adjusting a camshaft position (plot 311, dashed line) between t1 and t2 to direct intake air from the intake manifold to the exhaust manifold via one or more engine cylinders. Herein, intake air is directed from the intake manifold to the exhaust manifold by adjusting the cylinder valve timing to a timing corresponding to higher positive valve overlap while maintaining the EGR valve closed. For example, the camshaft adjustment depicted at plot 311 may move the valve timing from a first valve timing (before t1) at negative valve overlap to a second valve timing (between t1 and t2) at positive valve overlap. In an alternate example, the first valve timing may correspond to a lower amount of positive valve overlap while the second valve timing may correspond to a larger amount of positive valve overlap. During the positive valve overlap (between t1 and t2), compressed intake air may be directed from downstream of the compressor to upstream of the turbine via one or more engine cylinders to provide extra mass flow to spin-up the turbine (plot This allows blow-through air to be provided via positive valve overlap only.

In one example, during the second tip-in, the valve timing (plot 311) is shifted from the timing corresponding to negative valve overlap to a timing corresponding to positive valve overlap because the valve timing required to provide positive overlap is within combustion stability limit 312. That is, if the camshaft position were adjusted to shift the valve timing to positive valve overlap (so as to provide blow-through air via the cylinders), combustion stability and engine torque output would not be degraded. Alternatively, during the second tip-in, a difference between the cylinder valve timing at lower positive valve overlap and a cylinder valve timing at positive valve overlap may be lower than a threshold amount due to which a timely VCT adjustment to and from the positive valve overlap position may be possible. In still another example, during the second tip-in, a change in engine torque output per degree of VCT change may be lower than a threshold amount. In other words, turbo lag would be reduced without affecting engine torque output, combustion stability, and fuel economy if the VCT adjustment were used to provide the blow-through air via positive valve overlap.

During the second tip-in, while directing air through the engine cylinders, a fuel injection amount to the engine cylinders may also be adjusted. Specifically, the fuel injection may be adjusted based on the total amount of air directed from the intake manifold to the exhaust manifold via the engine cylinders so to maintain an exhaust air-to-fuel substantially at stoichiometry. In the depicted example, between t1 and t2, a fuel injection is temporarily enriched (plot 314) with a degree of richness based on the amount of air directed via the cylinders. By providing additional fuel to match the additional blow-through air, a cylinder air-to-fuel ratio, and therefore an exhaust air-to-fuel ratio, may be maintained at stoichiometry 315. Additionally, the extra enthalpy may be directed to the turbine to further expedite turbine spin-up.

At t2, the turbine speed may reach a threshold speed 305 beyond which further blow-through air may not be required to assist in turbine spin-up. Consequently, at t2, the camshaft may be repositioned (plot 311) so that the valve timing is returned from the second valve timing to the first valve timing. At the same time, the EGR valve may be maintained closed (plot 309). By providing blow-through air (herein via positive overlap through the cylinders), turbine spin-up is expedited. As such, in the absence of blow-through air, the turbine spin-up may have been slower, as shown by plot 306 (dashed line). In this way, during the second tip-in, blow-through air may be provided via positive valve overlap through one or more engine cylinders to reduce turbo lag.

Now turning to FIG. 4, map 400 shows an example engine operation wherein turbo lag is reduced by directing intake air from downstream of a compressor in the intake manifold to upstream of a turbine in the exhaust manifold via each of external EGR and positive valve overlap. In the depicted example, the engine includes a variable cam timing (VCT) device for adjusting the cylinder valve timing. Specifically, map 400 depicts a change in pedal position (PP) at plot 402, a change in turbine speed at plot 404, an opening or closing state of an EGR valve in an EGR passage coupled upstream of the turbine and downstream of the compressor at plot 408, a change in camshaft position (or VCT adjustment) that adjusts a corresponding cylinder valve timing at plot 410, and a change in cylinder air-to-fuel ratio (cylinder AFR) relative to stoichiometry at plot 414.

In the current example, before t1, the engine may be operating with low boost. For example, the engine may be operating un-boosted or at a low boost level, as indicated by low turbine speeds at plot 404. At t1, a tip event is confirmed, as indicated by the change in pedal position (plot 402). In response to the tip-in event, a controller may be configured to direct compressed intake air from the intake manifold, downstream of a compressor, to the exhaust manifold, upstream of a turbine, to thereby provide additional mass flow and enthalpy to expedite turbine spin-up. As such, the compressed intake air that is blown-through, herein also referred to as blow-through air, may be provided via each of an EGR passage of the engine and through one or more engine cylinders operating with positive valve overlap, and wherein amounts of air directed via external EGR and air directed via the cylinders is based on engine operating conditions.

In the depicted example, in response to the tip-in event, the controller may determine a total amount of blow-through air required to spin-up the turbine. The controller may then determine a camshaft adjustment required to place the valve timing at positive valve overlap. In the current example, the adjustment required to shift the valve timing from an initial timing of lower positive overlap to a final timing of higher positive valve overlap (e.g., an initial timing of negative valve overlap to a final timing of positive valve overlap) may be outside a combustion stability limit 412. Thus, the controller may adjust the camshaft (plot 410) to adjust the valve timing from the initial timing (before t1) to a final timing that is at limit 412. The controller may then hold the camshaft at the adjusted position so as to maintain the valve timing at limit 412 between t1 and t2. This enables a portion of the required blow-through air to be provided via the cylinders using positive valve overlap. The controller may then open the EGR valve (plot 408) to provide a remaining portion of the blow-through air via the EGR passage.

It will be appreciated that the combustion stability limit 412 in the example of FIG. 4 may be lower than combustion stability limit 312 in the example of FIG. 3. As a result, a smaller portion of blow-through air is provided via the cylinders during positive valve overlap in the example of FIG. 4 as compared to the second tip-in of FIG. 3. Likewise, the EGR valve opening (plot 408) in the example of FIG. 4 may be smaller than the EGR valve opening (plot 308) in the first tip-in of FIG. 3. As a result, a smaller portion of blow-through air is provided via the EGR passage in the example of FIG. 4 as compared to the first tip-in of FIG. 3.

A proportion of the blow-through air provided via each approach may be adjusted based on engine operating conditions. As an example, as a change in engine torque corresponding to the required VCT adjustment exceeds a threshold amount, the amount of air directed via external EGR may be increased while the amount of air directed via positive valve overlap may be correspondingly decreased. As another example, as a difference between the initial valve timing and the final valve timing exceeds a threshold, the amount of air directed via external EGR may be increased while the amount of air directed via positive valve overlap is correspondingly decreased. As still another example, as the final valve timing corresponding to the positive valve overlap exceeds the combustion stability limit, the amount of air directed via external EGR may be increased while the amount of air directed via positive valve overlap is correspondingly decreased. In another example, if a difference between intake manifold pressure and exhaust manifold pressure is lower than a threshold, the amount of air directed via external EGR may be decreased while increasing the amount of air directed via positive valve overlap. As yet another example, when an exhaust catalyst temperature is higher than a threshold temperature, the amount of air directed via external EGR may be increased while decreasing the amount of air directed via positive valve overlap. In each of the above examples, increasing the amount of air directed via external EGR includes increasing an opening of the EGR valve, and decreasing the amount of air directed via positive valve overlap includes maintaining valve timing at or before a timing corresponding to the combustion stability limit.

Returning to FIG. 4, the camshaft adjustment may be maintained between t1 and t2 (plot 410). Likewise, the EGR valve may be opened for a duration between t1 and t2 (plot 408). With the EGR valve open and the camshaft adjusted to a position of higher positive valve overlap, compressed intake air may be directed from downstream of the compressor to upstream of the turbine via the EGR passage and via the cylinders to provide extra mass flow to spin-up the turbine (plot 404) between t1 and t2. While directing air through the EGR passage and via the cylinders, a fuel injection amount to the engine cylinders may also be adjusted. Specifically, the fuel injection may be adjusted based on the total amount of air directed from the intake manifold to the exhaust manifold via each of the EGR passage and via positive valve overlap so to maintain an exhaust air-to-fuel substantially at stoichiometry. In the depicted example, between t1 and t2, a fuel injection is temporarily enriched (plot 414) with a degree of richness based on the total amount of blow-through air. By providing additional fuel to match the additional blow-through air, a cylinder air-to-fuel ratio, and therefore an exhaust air-to-fuel ratio, may be maintained at stoichiometry 415. Additionally, the extra enthalpy may be directed to the turbine to further expedite turbine spin-up.

At t2, the turbine speed may reach a threshold speed 405 beyond which further blow-through air may not be required to assist in turbine spin-up. Consequently, at t2, the EGR valve may be closed (plot 408) and the camshaft may resume its initial position (plot 410) thereby also bringing the valve timing back to the initial valve timing of lower positive valve overlap. By providing blow-through air (herein via external EGR and via the cylinders), turbine spin-up is expedited. As such, in the absence of blow-through air, the turbine spin-up may have been slower, as shown by plot 406 (dashed line).

In this way, at least some blow-through air may be provided via external EGR while a at least another portion of blow-through air is provided through one or more engine cylinders via positive valve overlap. By using a combination of both approaches, turbine speed may be increased without requiring a valve timing to be shifted from a timing required for optimal engine performance. By reducing torque and fuel penalties associated with a VCT adjustment required to provide blow-through air, turbo lag can be addressed without degrading engine performance and fuel economy.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
directing intake air from an intake manifold, downstream of a compressor, to an exhaust manifold, upstream of a turbine via each of external EGR and positive valve overlap through a cylinder, wherein amounts of air directed via EGR and air directed via positive valve overlap are adjusted based on conditions, the adjustments including increasing the amount of air directed via EGR when a valve timing adjustment is outside of a range.

2. The method of claim 1, wherein the directing is in response to a tip-in event.

3. The method of claim 2, wherein directing intake air via external EGR includes opening an EGR valve in an EGR passage coupled between the intake manifold, downstream of the compressor, and the exhaust manifold upstream of the turbine.

4. The method of claim 3, wherein directing intake air via positive valve overlap includes adjusting a variable cam timing device to adjust an intake and/or exhaust valve timing of the cylinder from a first valve timing corresponding to no positive valve overlap to a second valve timing corresponding to positive intake valve to exhaust valve overlap.

5. The method of claim 4, wherein adjusting the amounts of air directed via EGR and air directed via positive valve overlap includes, if a change in engine torque corresponding to the variable cam timing device adjustment is higher than a threshold amount, increasing the amount of air directed via external EGR while decreasing the amount of air directed via positive valve overlap.

6. The method of claim 4, wherein adjusting the amounts of air directed via EGR and air directed via positive valve overlap includes, if a difference between the first valve timing and the second valve timing exceeds a threshold, increasing the amount of air directed via external EGR while decreasing the amount of air directed via positive valve overlap.

7. The method of claim 4, wherein adjusting the amounts of air directed via EGR and air directed via positive valve overlap includes, if the second valve timing corresponding to the positive valve overlap exceeds a combustion stability limit, increasing the amount of air directed via external EGR while decreasing the amount of air directed via positive valve overlap.

8. The method of claim 7, wherein increasing the amount of air directed via external EGR includes increasing an opening of the EGR valve, and wherein decreasing the amount of air directed via positive valve overlap includes maintaining valve timing at or before a timing corresponding to the combustion stability limit.

9. The method of claim 4, wherein the directing via positive valve overlap, EGR, or both is performed until a turbine speed reaches a threshold, the method further comprising, after the turbine speed reaches the threshold, closing the EGR valve and resuming the first valve timing.

10. The method of claim 4, wherein adjusting the amounts of air directed via EGR and air directed via positive valve overlap includes, when a difference between intake manifold pressure and exhaust manifold pressure is lower than a threshold, decreasing the amount of air directed via external EGR while increasing the amount of air directed via positive valve overlap.

11. The method of claim 4, wherein adjusting the amounts of air directed via EGR and air directed via positive valve overlap includes, when an exhaust catalyst temperature is higher than a threshold temperature, increasing the amount of air directed via external EGR while decreasing the amount of air directed via positive valve overlap.

12. The method of claim 1, further comprising, during the directing, adjusting a fuel injection amount based on the amounts of air directed via EGR and air directed via positive valve overlap so as to maintain an exhaust air-to-fuel ratio at or around stoichiometry.

* * * * *